United States Patent
Proell et al.

(10) Patent No.: US 10,985,427 B2
(45) Date of Patent: Apr. 20, 2021

(54) METHOD FOR PRODUCING AN ELECTRODE STACK FOR A BATTERY CELL, BATTERY CELL

(71) Applicant: Robert Bosch GmbH, Stuttgart (DE)

(72) Inventors: Johannes Proell, Bamberg (DE); Thomas Kretschmar, Zapfendorf (DE); Thomas Juestel, Hirschaid-Juliushof (DE)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 16/336,143

(22) PCT Filed: Sep. 15, 2017

(86) PCT No.: PCT/EP2017/073254
§ 371 (c)(1),
(2) Date: Mar. 25, 2019

(87) PCT Pub. No.: WO2018/059967
PCT Pub. Date: Apr. 5, 2018

(65) Prior Publication Data
US 2020/0028140 A1 Jan. 23, 2020

(30) Foreign Application Priority Data
Sep. 27, 2016 (DE) .................... 10 2016 218 495.4

(51) Int. Cl.
*H01M 50/46* (2021.01)
*H01M 50/403* (2021.01)

(52) U.S. Cl.
CPC ......... *H01M 50/46* (2021.01); *H01M 50/403* (2021.01)

(58) Field of Classification Search
None
See application file for complete search history.

(56) References Cited

U.S. PATENT DOCUMENTS

2004/0076882 A1* 4/2004 Hosoya ................ H01M 4/131
429/223
2009/0239133 A1 9/2009 Kosugi
(Continued)

FOREIGN PATENT DOCUMENTS

CA 978593 11/1975
CN 203932198 11/2014
(Continued)

OTHER PUBLICATIONS

International Search Report for Application No. PCT/EP2017/073254 dated Nov. 28, 2017 (English Translation, 3 pages).

*Primary Examiner* — Haroon S. Sheikh
*Assistant Examiner* — Alex Rae
(74) *Attorney, Agent, or Firm* — Michael Best & Friedrich LLP

(57) ABSTRACT

The invention relates to a method for producing an electrode stack for a battery cell, comprising the following steps: providing a strip-shaped anode element (45) comprising an anodic current discharger (31) to which an anodic active material (41) is applied; providing a strip-shaped cathode element (46) comprising a cathodic current discharger (32) to which a cathodic active material (42) is applied; providing at least one strip-shaped separator element (16); introducing grooves (70) into the cathodic active material (42) around segmentation lines (S); generating a strip-shaped composite element (50) by applying the cathode element (46) onto the anode element (45), with the interposition of the at least one separator element (16); cutting the composite element (50) into plate-shaped composite segments at the segmentation lines (S); and stacking the composite segments. The invention also relates to a battery cell comprising at least one electrode stack which is produced according to the method according to the invention.

13 Claims, 4 Drawing Sheets

(56) References Cited

U.S. PATENT DOCUMENTS

| | | | | |
|---|---|---|---|---|
| 2011/0039140 A1* | 2/2011 | Miyahisa | ............ | H01M 10/0525 |
| | | | | 429/94 |
| 2014/0053383 A1* | 2/2014 | Holl | .................. | H01G 13/02 |
| | | | | 29/25.41 |
| 2014/0363727 A1* | 12/2014 | Ko | ................. | H01M 10/0472 |
| | | | | 429/149 |

FOREIGN PATENT DOCUMENTS

| | | |
|---|---|---|
| DE | 102011075063 | 11/2012 |
| DE | 102014200011 | 7/2015 |
| JP | 2005535480 A | 11/2005 |
| WO | 0242191 | 5/2002 |
| WO | 2012065767 | 5/2012 |
| WO | 2015015274 | 2/2015 |

\* cited by examiner

METHOD FOR PRODUCING AN ELECTRODE STACK FOR A BATTERY CELL, BATTERY CELL

BACKGROUND OF THE INVENTION

The invention relates to a method for producing an electrode stack for a battery cell by cutting strip-shaped elements into plate-shaped segments and stacking the segments. The invention also relates to a battery cell, which comprises an electrode stack that is produced by such a method.

Electrical energy can be stored by means of batteries. Batteries convert chemical reaction energy into electrical energy. In this case, distinction is made between primary batteries and secondary batteries. Primary batteries are only functional once, while secondary batteries, which are also referred to as accumulators, are rechargeable. In an accumulator, so-called lithium ion battery cells are in particular used. These are distinguished inter alia by high energy densities, thermal stability and an extremely low self-discharge.

Lithium ion battery cells comprise a positive electrode, which is also referred to as the cathode, and a negative electrode, which is also referred to as the anode. The cathode and the anode each comprise a current collector, onto which an active material is applied. The electrodes of the battery cell are configured in the form of foils and are stacked with interposition of a separator, which separates the anode and the cathode, for example to form an electrode stack. The electrodes may also be wound to form an electrode winding, or form an electrode unit in another way.

The two electrodes of the electrode unit are electrically connected to poles of the battery cell, which are also referred to as terminals. The electrodes and the separator are surrounded by a generally liquid electrolyte. The battery cell furthermore comprises a cell housing, which is for example made of aluminum. The cell housing is generally shaped as a prism, in particular as a cuboid, and is configured to be pressure-resistant. Other housing shapes are, however, also known, for example circular-cylindrical, or alternatively flexible pouch cells.

One essential aim in the development of new battery cells is to increase the usable electrochemical volume in the cell. The electrode stack has been found to be the most suitable design of an electrode unit in order to maximize the usable volume, since this can be produced ideally prismatically as well as in any other desired geometry.

In lithium ion battery cells, metallization of the lithium provided for the charge transport may occur. Metallized lithium is then no longer available for the charge transport, and the capacity of the battery cell therefore decreases. The metallization of lithium may be prevented, or at least reduced, when the anode in the electrode stack protrudes beyond the cathode.

WO 2015/015274 discloses a battery having an electrode unit, which comprises a negative electrode foil and a positive electrode foil. The negative electrode foil in this case has a greater width than the positive electrode foil.

US 2011/0039140 discloses a battery having an electrode unit, which comprises a negative electrode and a positive electrode. The positive electrode has a current collector, which is coated with active material on both sides. Grooves are introduced into the active material.

CN 203932198 discloses a lithium ion battery which comprises an electrode unit having electrode foils. One of the electrode foils has a current collector, which is coated with active material. Grooves are introduced into the active material by means of a laser.

SUMMARY OF THE INVENTION

A method for producing an electrode stack for a battery cell is proposed. The method in this case comprises at least the steps mentioned below.

First, a strip-shaped anode element which comprises an anodic current collector, onto which an anodic active material is applied, is provided. Likewise, a strip-shaped cathode element which comprises a cathodic current collector, onto which a cathodic active material is applied, is provided. Furthermore, at least one strip-shaped separator element is provided.

The anode element, the cathode element and the at least one separator element are in the present case configured to be flat and strip-shaped. In this context, this means that an extent of said elements in the longitudinal direction is much greater, in particular at least ten times greater, than an extent of said elements in a transverse direction, which is oriented perpendicularly to the longitudinal direction.

Subsequently, grooves are introduced into the cathodic active material around segmentation lines. Preferably, the grooves are in this case introduced into the cathodic active material in such a way that the segmentation lines are centered in the grooves. The grooves in this case preferably penetrate fully through the cathodic active material, and therefore preferably extend as far as the cathodic current collector.

A strip-shaped composite element is then produced by applying the cathode element onto the anode element with interposition of the at least one separator element. The cathode element, the at least one separator element and the anode element are preferably connected, in particular laminated, to one another.

Subsequently, cutting of the composite element into plate-shaped composite segments is carried out on the segmentation lines of the cathodic active material, around which the grooves were previously introduced. This operation is also referred to as "division".

The cathode element, the at least one separator element and the anode element are in this case cut together into plate-shaped segments in the same working step. The composite segments produced in this way respectively comprise a cathode segment, an anode segment and at least one separator segment, which are preferably connected to one another.

The composite segments, like the cathode segments, the anode segments and the separator segments, are in the present case configured to be flat and plate-shaped. In this context, this means that an extent of said segments in the longitudinal direction is approximately the same size, in particular at least half as great and at most two times as great, as an extent of said segments in the transverse direction.

Stacking of the previously produced composite segments is then carried out. By stacking a sufficient number of composite segments, the electrode stack for the battery cell is formed.

Advantageously, the anode element has a width in the transverse direction which is greater than a width of the cathode element in the transverse direction. The anode element therefore protrudes beyond the cathode element in the transverse direction inside the composite element. The anode segments therefore also protrude beyond the cathode segments in the transverse direction inside the composite segments.

Preferably, the segmentation lines and the grooves introduced into the cathodic active material extend in the transverse direction, and therefore perpendicularly to the longitudinal direction.

Preferably, the cathodic active material is in this case applied on both sides onto the cathodic current collector. In this case, the grooves are preferably introduced on both sides into the cathodic active material. Likewise, the anodic active material is preferably applied on both sides onto the anodic current collector.

According to one preferred configuration of the method, a plurality of the grooves, preferably all of the grooves, are introduced into the cathodic active material by means of a laser.

According to one advantageous embodiment of the invention, a plurality of the grooves, preferably all of the grooves, have an at least approximately U-shaped cross section.

According to another advantageous embodiment of the invention, a plurality of the grooves, preferably all of the grooves, have an at least approximately triangular cross section.

According to a further advantageous embodiment of the invention, a plurality of the grooves, preferably all of the grooves, have an at least approximately rectangular cross section.

A battery cell is also proposed, which comprises at least one electrode stack that is produced by the method according to the invention.

A battery cell according to the invention may advantageously be used in an electrical vehicle (EV), in a hybrid vehicle (HEV), in a plug-in hybrid vehicle (PHEV) or in a consumer electronics product. Consumer electronics products are intended in particular to mean cell phones, tablet PCs or notebooks.

The method according to the invention forms an electrode stack, in which the anode protrudes beyond the cathode. The metallization of lithium in the electrode stack is therefore advantageously prevented or at least avoided.

The process time required when stacking composite segments is also advantageously reduced in comparison with stacking individual electrode segments and individual separator segments. Furthermore, the orientation of the composite segments with respect to one another when stacking is less affected by tolerance, and therefore less susceptible to error, than stacking individual anode segments, individual cathode segments and individual separator segments. In this way, the costs for producing an electrode stack are advantageously reduced. The grooves may have an almost arbitrary cross section, whereby particular cross-sectional shapes are found to be particularly advantageous, depending on the production method. By the introduction of the grooves, the active material is locally removed from the current collector. This removal of the active material may be carried out in several ways, for example mechanically. Preferably, however, the removal of the active material is carried out by means of a laser, so that the process time for producing the electrode stack is advantageously reduced, and so that the costs for producing an electrode stack are reduced further.

BRIEF DESCRIPTION OF THE DRAWINGS

Embodiments of the invention will be explained in more detail with the aid of the drawings and the description below. In the drawings.

DETAILED DESCRIPTION

In the following description of the embodiments of the invention, elements which are the same or similar are denoted by the same references, repeated description of these elements being omitted in individual cases. The figures represent the subject-matter of the invention only schematically.

Figure 1:
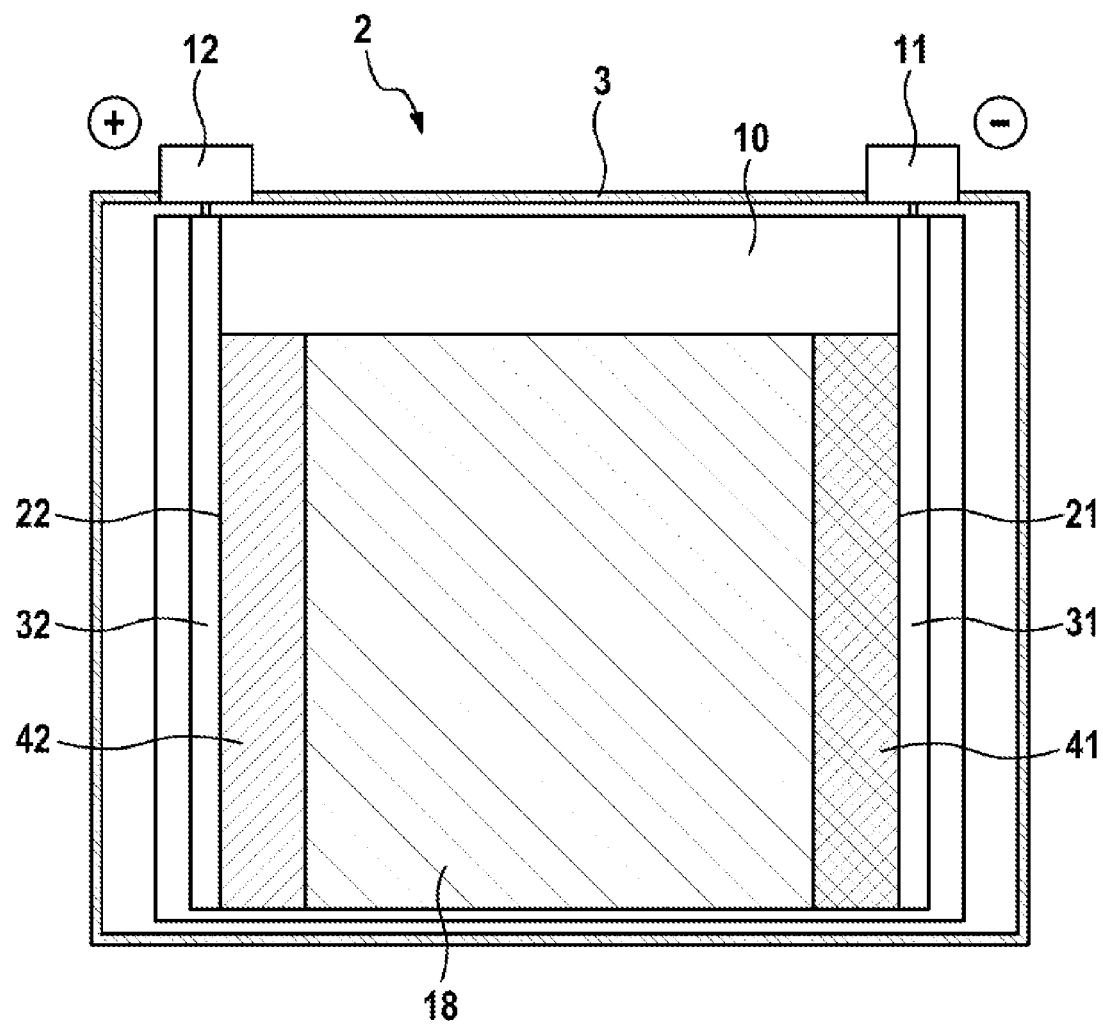
FIG. 1 shows a schematic representation of a battery cell.

FIG. 1 shows a schematic representation of a battery cell 2. The battery cell 2 comprises a housing 3 which is shaped as a prism, in the present case as a cuboid. The housing 3 is in the present case configured to be electrically conductive, and is for example made of aluminum.

The battery cell 2 comprises a negative terminal 11 and a positive terminal 12. By means of the terminals 11, 12, a voltage provided by the battery cell 2 can be tapped. Furthermore, the battery cell 2 may also be charged by means of the terminals 11, 12.

Arranged inside the housing 3 of the battery cell 2, there is an electrode unit, which in the present case is configured as an electrode stack 10. The electrode stack 10 has two electrodes, namely an anode 21 and a cathode 22. The anode 21 and the cathode 22 are respectively configured in a foil-like manner, and are separated from one another by a separator 18. The separator 18 is ionically conductive, i.e. permeable for lithium ions.

The anode 21 comprises an anodic active material 41 and an anodic current collector 31. The anodic current collector 31 is configured to be electrically conductive and is made of a metal, for example of copper. The anodic current collector 31 is electrically connected to the negative terminal 11 of the battery cell 2.

The cathode 22 comprises a cathodic active material 42 and a cathodic current collector 32. The cathodic current collector 32 is configured to be electrically conductive and is made of a metal, for example of aluminum. The cathodic current collector 32 is electrically connected to the positive terminal 12 of the battery cell 2.

Figure 2:
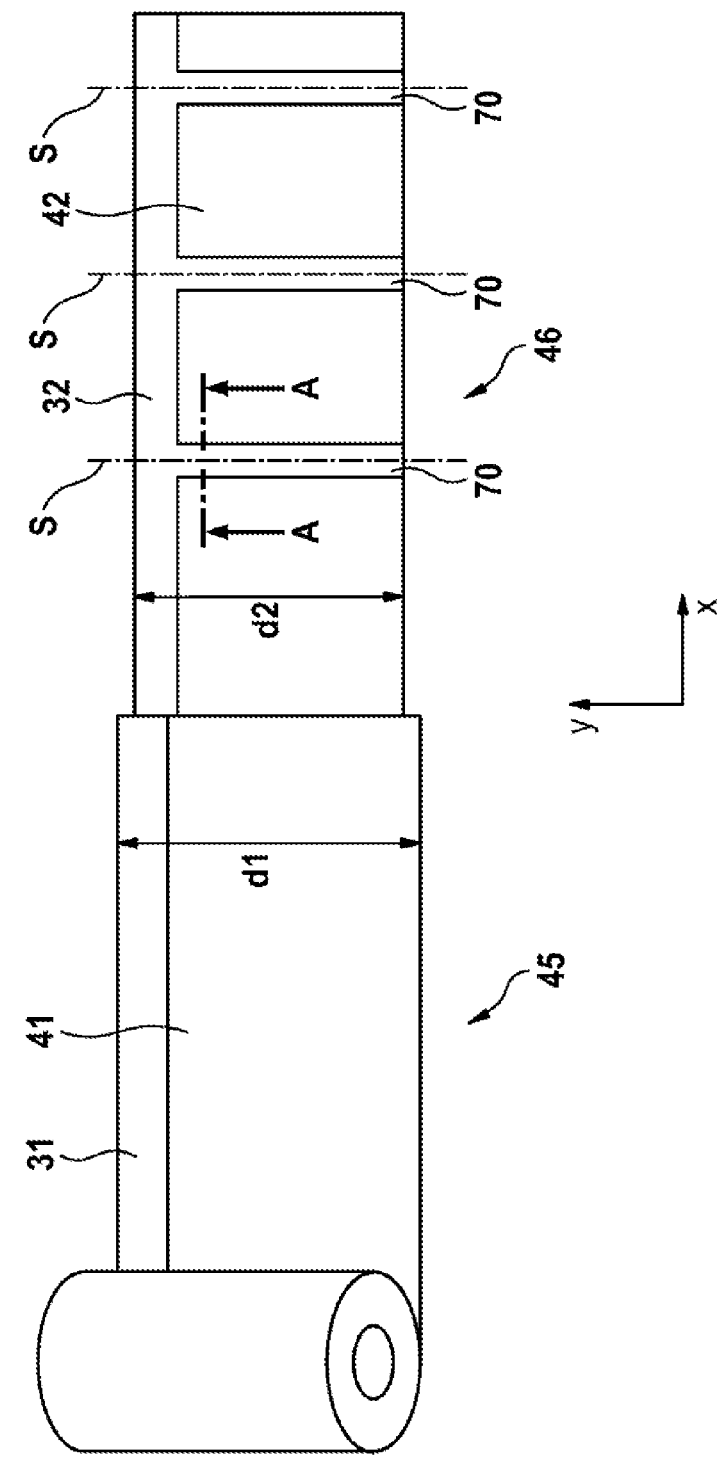
FIG. 2 shows a schematic representation of an anode element and a cathode element.

FIG. 2 shows a schematic representation of an anode element 45 and a cathode element 46. The anode element 45 and the cathode element 46 are configured to be flat and strip-shaped. An extent of the anode element 45 and of the cathode element 46 in a longitudinal direction x is much greater, in particular at least ten times greater, than an extent of the anode element 45 and of the cathode element 46 in a transverse direction y, which is oriented perpendicularly to the longitudinal direction x. The anode element 45 and the cathode element 46 are respectively wound onto a roll.

The anode element 45 comprises an anodic current collector 31, onto which an anodic active material 41 is applied. The anodic active material 41 is applied on both sides onto the anodic current collector 31. The anode element 45 has a width d1 in the transverse direction y.

The cathode element 46 comprises a cathodic current collector 32, onto which a cathodic active material 42 is applied. The cathodic active material 42 is applied on both sides onto the cathodic current collector 32. The cathode element 46 has a width d2 in the transverse direction y, which is less than the width d1 of the anode element 45.

Introduced into the cathodic active material 42, there are grooves 70 which extend in the transverse direction y. The grooves 70 in this case penetrate fully through the cathodic active material 42, and extend as far as the cathodic current collector 32. The grooves 70 are introduced on both sides into the cathodic active material 42. Said grooves 70 are introduced into the cathodic active material 42 by means of a laser.

The grooves 70 are introduced around segmentation lines S into the cathodic active material 42. The segmentation lines S are in this case centered in the grooves 70. The segmentation lines S likewise extend in the transverse direction y, and are arranged at equidistant intervals from one another in the longitudinal direction x.

Figure 3A:
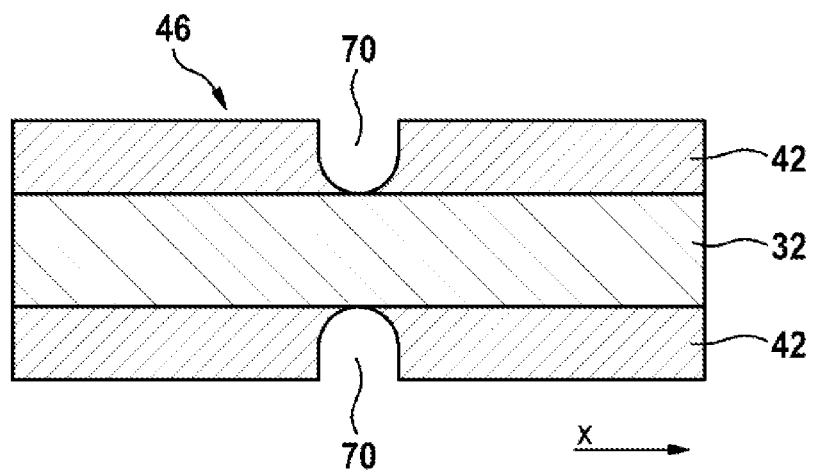
FIG. 3a shows a schematic sectional representation of the cathode element along the section line A-A in FIG. 2 according to a first embodiment.

FIG. 3a shows a schematic sectional representation of the cathode element 46 along the section line A-A in FIG. 2 according to a first embodiment. The grooves 70 in this case have an approximately U-shaped cross section. The outer walls of the grooves 70 initially extend parallel to one another in a region away from the cathodic current collector 32, and merge into a semicircular rounding when approaching the cathodic current collector 32.

Figure 3B:
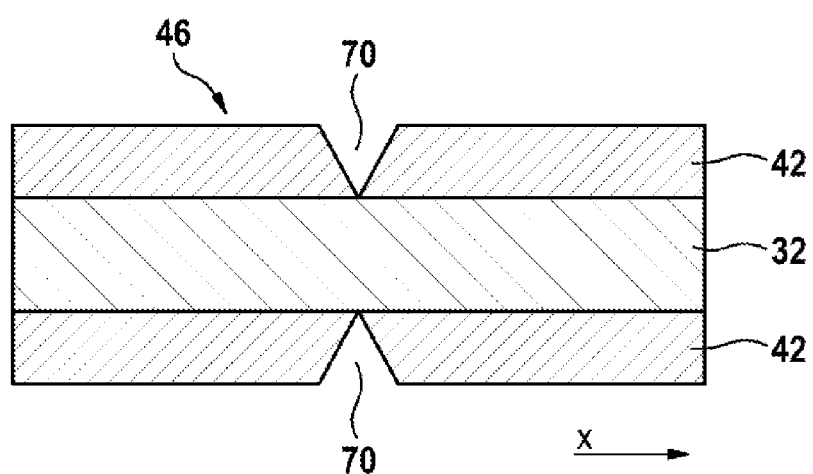
FIG. 3b shows a schematic sectional representation of the cathode element along the section line A-A in FIG. 2 according to a second embodiment.

FIG. 3b shows a schematic sectional representation of the cathode element 46 along the section line A-A in FIG. 2 according to a second embodiment. The grooves 70 in this case have an at least approximately triangular cross section. The outer walls of the grooves 70 are spaced relatively wide apart from one another in a region away from the cathodic current collector 32, and extend at an angle to one another and converge when approaching the cathodic current collector 32.

Figure 3C:
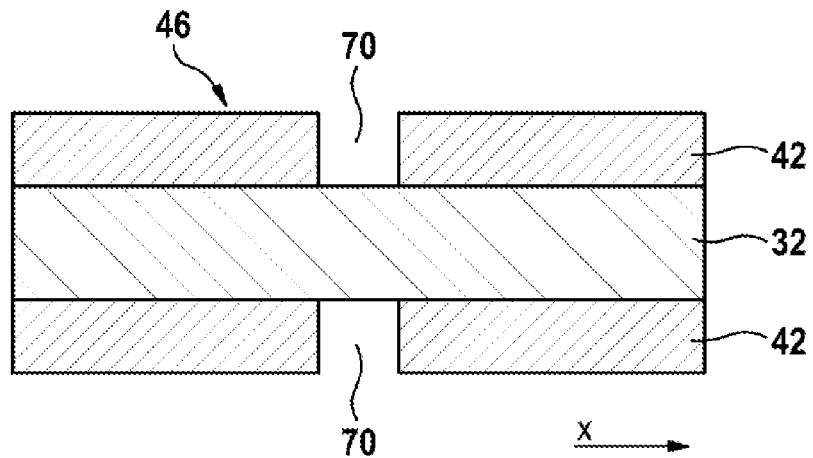
FIG. 3c shows a schematic sectional representation of the cathode element along the section line A-A in FIG. 2 according to a third embodiment.

FIG. 3c shows a schematic sectional representation of the cathode element 46 along the section line A-A in FIG. 2 according to a third embodiment. The grooves 70 in this case have an at least approximately rectangular cross section. The outer walls of the grooves 70 are spaced apart from one another in a region away from the cathodic current collector 32, and extend parallel to one another, and perpendicularly to the cathodic current collector 32, towards the cathodic current collector 32.

Figure 4:
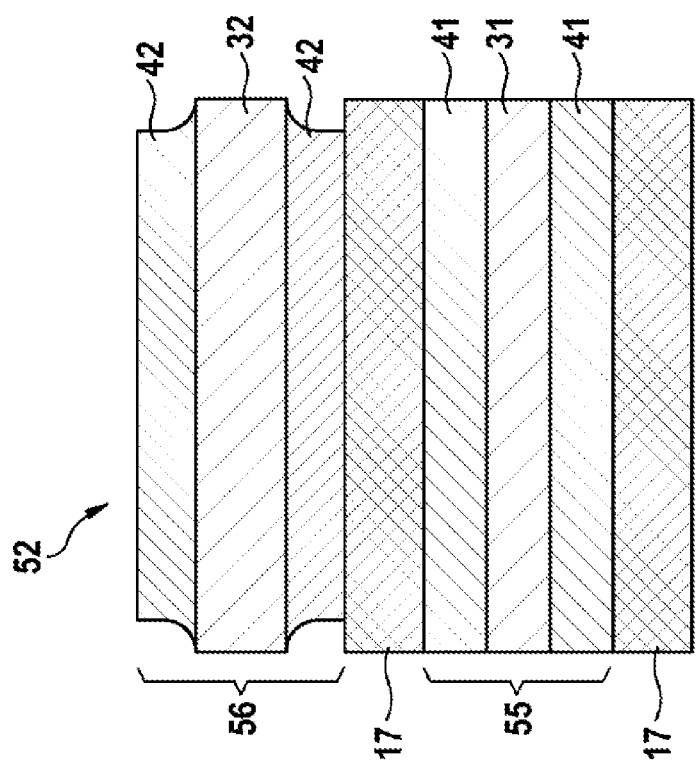
FIG. 4 shows a schematic sectional representation of a composite element.

FIG. 4 shows a schematic sectional representation of a composite element 50, which comprises a cathode element 46 according to the first embodiment, as shown by FIG. 3a. The composite element 50 furthermore comprises an anode element 45, as well as a first separator element 16 and a second separator element 16.

The cathode element 46 is in this case applied onto the first separator element 16 and connected to the first separator element 16. The anode element 45 is applied on a side of the first separator element 16 facing away from the cathode element 46, and is connected to the first separator element 16. The second separator element 16 is applied on a side of the anode element 45 facing away from the first separator element 16, and is connected to the anode element 45.

The composite element 50 is formed in the present case by applying the cathode element 46 onto the anode element 45 with interposition of the first separator element 16 and application of the second separator element 16 onto the anode element 45. The composite element 50 is then cut on the segmentation lines S in the grooves 70 in the cathodic active material 42. Plate-shaped composite segments 52 are therefore formed by the cutting of the strip-shaped composite element 50 on said segmentation lines S.

Figure 5:
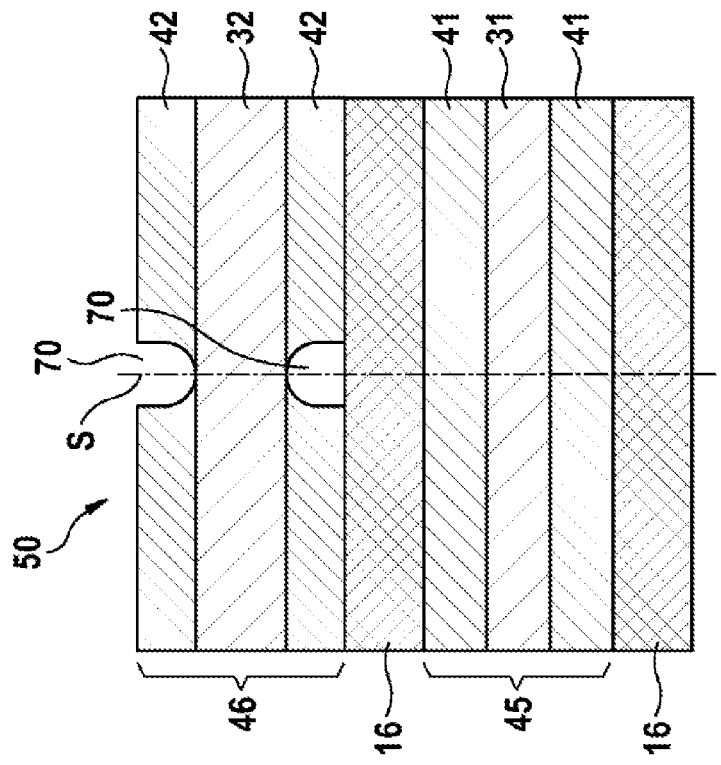
FIG. 5 shows a schematic sectional representation of a composite segment.

FIG. 5 shows a schematic sectional representation of such a composite segment 52. The composite segment 52 produced in this way comprises a cathode segment 56, an anode segment 55 and two separator segments 17. In this case, a first separator segment 17 is arranged between the anode segment 55 and the cathode segment 56. A second separator segment 17 is arranged on the side of the anode segment 55 facing away from the first separator segment 17. The cathode segment 56, the anode segment 55 and the two separator segments 17 are connected to one another.

A plurality of such composite segments 52 are then stacked on one another to form the electrode stack 10. The composite segments 52 are in this case stacked on one another with the same orientation. There is therefore always the sequence separator segment 17—anode segment 55—separator segment 17—cathode segment 56—separator segment 17, etc.

Contact lugs (not represented here) of the anode 21 protrude out of the composite segments 52 from the anodic current collectors 31. Contact lugs (not represented here) of the cathode 22 protrude out of the composite segments 52 from the cathodic current collectors 32. The composite segments 52 are arranged during the stacking in such a way that the contact lugs of the anode 21 are flush, and that the contact lugs of the cathode 22 are flush. In this case, the contact lugs of the anode 21 are positioned offset with respect to the contact lugs of the cathode 22.

The contact lugs of the anode 21 are subsequently electrically connected to one another and to the negative terminal 11 of the battery cell 2. Likewise, the contact lugs of the cathode 22 are subsequently electrically connected to one another and to the positive terminal 12 of the battery cell 2. The connection of the contact lugs to one another and to the terminals 11, 12 is preferably carried out by welding.

The invention is not restricted to the exemplary embodiments described here and the aspects highlighted therein. Rather, many variants which lie within the capability of the person skilled in the art, are possible within the scope specified by the claims.

What is claimed is:

1. A method for producing an electrode stack (10) for a battery cell (2), comprising the following steps:
   providing a strip-shaped anode element (45), comprising an anodic current collector (31) onto which an anodic active material (41) is applied,
   providing a strip-shaped cathode element (46), comprising a cathodic current collector (32) onto which a cathodic active material (42) is applied,
   providing at least one strip-shaped separator element (16),
   forming a plurality of grooves (70), each of the plurality of grooves (70) penetrating fully through the cathodic active material (42) and extending as far as the cathodic current collector (32), and each of the plurality of grooves (70) being formed along a respective segmentation line (S), producing a strip-shaped composite element (50) by applying the cathode element (46) onto the anode element (45) with interposition of the at least one separator element (16), cutting the composite element (50) into plate-shaped composite segments (52) on the segmentation lines (S), and stacking the composite segments (52).

2. The method as claimed in claim 1, wherein the anode element (45) has a width (d1) in a transverse direction (y) which is greater than a width (d2) of the cathode element (46) in the transverse direction (y).

3. The method as claimed in claim 2, wherein the segmentation lines (S) and the plurality of grooves (70) extend in the transverse direction (y).

4. The method as claimed in claim 1, wherein the cathodic active material (42) is applied on both sides of the cathodic current collector (32), and wherein the plurality of grooves (70) are formed on both sides into the cathodic active material (42).

5. The method as claimed in claim 1, wherein the plurality of the grooves (70) are formed into the cathodic active material (42) by a laser.

6. The method as claimed in claim 1, wherein the plurality of the grooves (70) have an at least approximately U-shaped cross section.

7. The method as claimed in claim 1, wherein the plurality of the grooves (70) have an at least approximately triangular cross section.

8. The method as claimed in claim 1, wherein the plurality of the grooves (70) have an at least approximately rectangular cross section.

9. The method as claimed in claim 3, wherein the cathodic active material (42) is applied on both sides of the cathodic current collector (32), and wherein the plurality of grooves (70) are formed on both sides into the cathodic active material (42).

10. The method as claimed in claim 9, wherein the plurality of the grooves (70) are formed into the cathodic active material (42) by a laser.

11. The method as claimed in claim 10, wherein the plurality of the grooves (70) have an at least approximately U-shaped cross section.

12. The method as claimed in claim 10, wherein the plurality of the grooves (70) have an at least approximately triangular cross section.

13. The method as claimed in claim 10, wherein the plurality of the grooves (70) have an at least approximately rectangular cross section.

\* \* \* \* \*